Jan. 15, 1963  F. G. SALIBA ETAL  3,074,049
ALARM SYSTEM FOR MOTOR VEHICLES
Filed June 20, 1961
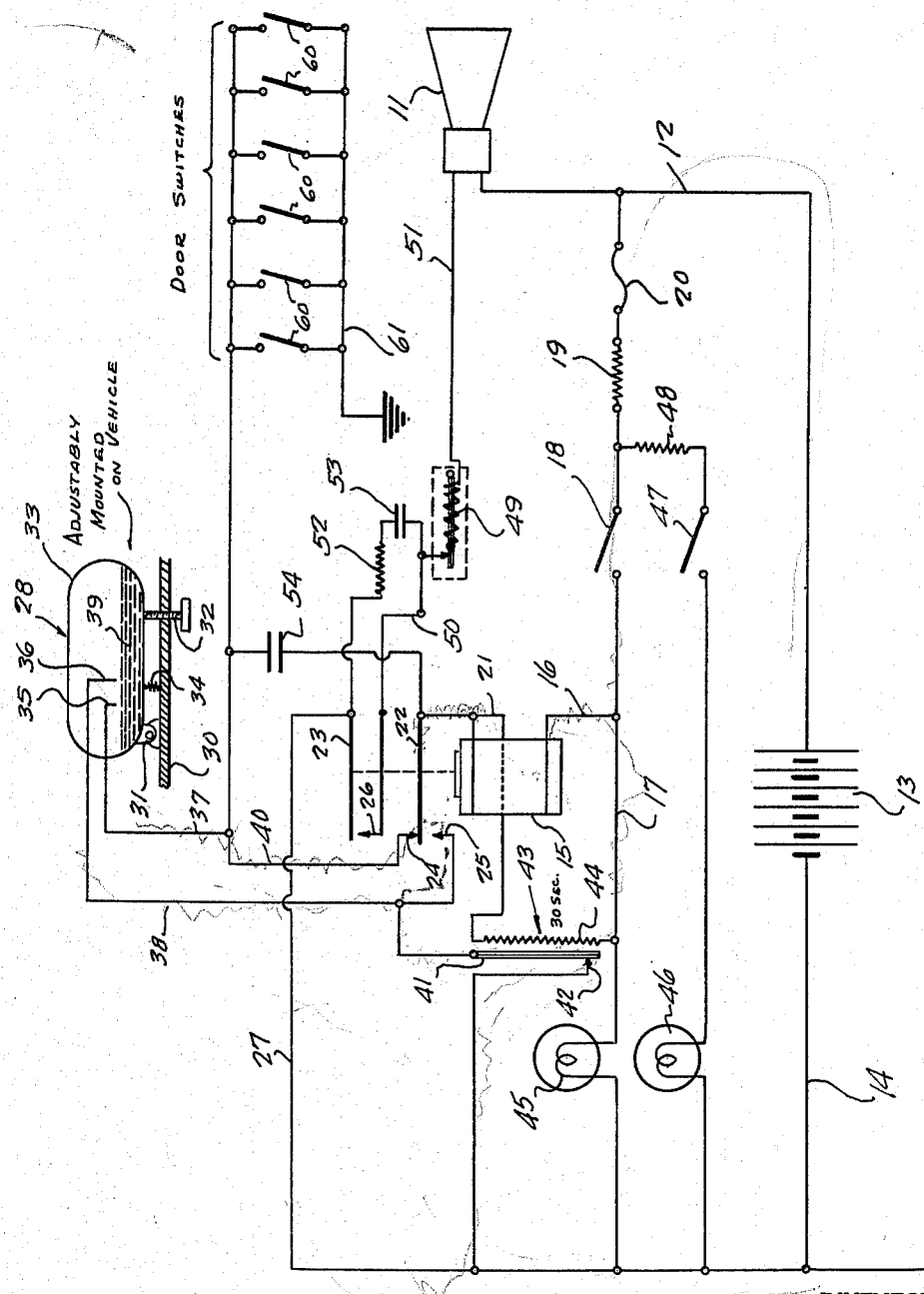
INVENTORS.
FRANCOIS G. SALIBA,
NICOLAS G. SATEL,
BY
McMorrow, Berman & Davidson
ATTORNEYS.

3,074,049
ALARM SYSTEM FOR MOTOR VEHICLES
Francois Georges Saliba, % American Embassy, and Nicolas G. Satel, Rue Tannoukhivine, both of Beirut, Lebanon
Filed June 20, 1961, Ser. No. 118,370
3 Claims. (Cl. 340—65)

This invention relates to safety devices for motor vehicles, and more particularly to an alarm system to protect a motor vehicle against theft or damage.

A main object of the invention is to provide a novel and improved automatic alarm system for motor vehicles which is useful in protecting a motor vehicle against theft or damage, the system being relatively simple in construction, being easy to install, and providing a timed audible alarm when the vehicle on which it is employed is entered or shaken by an unauthorized individual.

A further object of the invention is to provide an improved automatic alarm system for protecting a motor vehicle against unauthorized entry or against oscillation or tilting thereof when the vehicle is parked or when the owner of the vehicle is absent, the system involving inexpensive components, being reliable in operation, being easy to adjust to a desired degree of sensitivity, and occupying relatively little space so that it may be easily mounted in any convenient location on a motor vehicle.

A still further object of the invention is to provide an improved alarm system for protecting a motor vehicle against entry by an unauthorized person or against oscillation or shaking when the vehicle is parked or is unattended by its owner, the system including means for automatically energizing an audible alarm device for a timed period responsive to the opening of any one of the doors of the vehicle or of the trunk or hood of the vehicle, as well as when the vehicle is tilted or oscillated from its normal rest position.

Further objects and advantages of the invention will become apparent from the following description and claims, and from the single FIGURE which is a wiring diagram showing the electrical circuit connections of an alarm system constructed in accordance with the present invention.

Referring to the drawings, the alarm system comprises an electrically operated audible alarm device, for example, an electric horn 11 having one terminal thereof connected by a wire 12 to one pole of the vehicle battery 13, for example, to the positive pole of the battery in a typical system where the negative pole of the battery is grounded to the vehicle frame, as by a ground wire 14. Designated at 15 is a relay which is mounted in any suitable location in the vehicle and which has one terminal of its winding connected by a wire 16 to a wire 17. Wire 17 is connected through a master switch 18, a suitable resistor 19 and a fuse 20 to the wire 12. The remaining terminal of the winding of relay 15 is connected to a wire 21. The relay 15 is provided with the armatures 22 and 23, the armature 22 normally engaging an upper stationary contact 24 and being engageable with a lower stationary contact 25 responsive to the energization of the relay. The upper armature 23 is engageable with a lower contact 26 responsive to the energization of the relay. The armature 23 is connected to ground by a wire 27.

Designated at 28 is a mercury switch which is adjustably mounted on the vehicle in a position to be tilted when the vehicle is shaken or tilted from a position of rest. Thus, the mercury switch 28 may be mounted in a transversely extending position with respect to the vehicle, and may be provided with suitable adjusting means, for example, may be pivotally mounted on a horizontal portion 30 of the vehicle for rotational adjustment around a pivotal point 31 which is arranged with its axis extending longitudinally of the vehicle. An adjusting screw 32 may be provided, the screw being threadedly engaged through the horizontal stationary supporting element 30 and being engageable with the bottom of the mercury container 33 so that the container may be adjusted around the pivotal point 31 responsive to the adjustment of the screw 32. A suitable spring 34 may be employed to bias the container against the top end of the adjusting screw 32, as diagrammatically illustrated.

The mercury container 33 is provided interiorly with a pair of spaced vertical electrodes 35 and 36 which are connected respectively to external lead wires 37 and 38. The container 33 contains a quantity of mercury 39 which is adapted to conductively connect the electrodes 35 and 36 responsive to the inclination of the support 30, namely, when the vehicle is tilted by a predetermined amount. For example, the container 33 may be adjusted so that when a person enters the vehicle and occupies the driver's seat, the vehicle will be inclined sufficiently to cause the mercury 39 to electrically connect the depending vertical electrodes 35 and 36. Similarly, if the vehicle should be oscillated, the mercury 39 will momentarily connect the electrodes 35 and 36.

The upper contact 24 of relay 15 is connected by a wire 40 to the wire 37 and hence to the electrode 35. The wire 38 is connected to the ground wire 27 through the armature 41 and stationary contact 42 of a normally closed, thermally operated timed switch device 43, said switch device being provided with a heater winding 44 connected between the wire 17 and the wire 21. The timed switch 43 is of conventional construction and is arranged so that the heat therefrom will cause the armature 41, which may be of bimetal construction, to disengage from the contact 42 after a predetermined period of time, for example, after thirty seconds of energization of the winding 44.

A pilot lamp 45 is connected between wire 17 and ground wire 27, the lamp being energized responsive to the closure of the master control switch 18 to indicate that the apparatus has been placed in operation. An additional lamp 46 is connected through a control switch 47 and a resistor 48 to the wire 49 connecting switch 18 to resistor 19, the lamp 46 being employed to illuminate the portion of the vehicle containing the adjustable mercury switch 28 to enable the adjustment of the switch to be made at night, or under conditions wherein the switch is located in a relatively dark portion of the vehicle.

The lower contact 26 associated with armature 23 is connected through a wire 50 and a blinker switch 49 to the remaining terminal wire 51 of the electric horn 11. A spark suppressing circuit comprising a resistor 52 and a condenser 53 connected in series is connected between the armature 23 and the wire 50, to quench sparks which might otherwise develop between armature 23 and contact 26. A condenser 54 is connected between wire 40 and armature 22 to prevent chattering of relay 15.

Respective normally open switches 60 are provided in association with the respective doors of the vehicle and with the trunk door and vehicle hood, the switches 60 being of conventional construction and being arranged so as to close responsive to the opening of the associated door element or swingable element. One terminal of each switch 60 is connected to the vehicle frame by a wire 61. The remaining terminal of each switch is connected to the wire 40.

The master control switch 18 is preferably mounted externally of the vehicle at a relatively inconspicuous or hidden location thereon, to enable the owner or operator of the vehicle to close the switch when he leaves the same parked. The pilot lamp 45, which may be located inside the vehicle, becomes energized when the switch 18 is closed, since this connects the wire 17 to the ungrounded terminal of the vehicle battery through the switch 18, wire 49, resistor 19, fuse 20 and wire 12. Thereafter, if the vehicle is oscillated or tilted sufficiently to cause the electrodes 35 and 36 to be electrically connected together by the mercury 39, the relay 15 becomes energized through a circuit comprising wire 17 (connected to the ungrounded battery terminal), wire 16, the winding of the relay, wire 21, armature 22, contact 24, wire 40, wire 37, the bridged electrodes 35 and 36, wire 38, arm 41, contact 42 and ground wire 27. Upon energization of the relay the armature 22 moves downwardly to engage the lower contact 25, establishing a holding circuit for the relay through armature 22, contact 25, arm 41, contact 42 and ground wire 27.

With the relay 15 energized, armature 23 engages contact 26, energizing the electric horn 11 through a circuit comprising the wire 12 connected to the ungrounded battery terminal, the winding of the horn, wire 51, the blinker switch 49 which intermittently opens and closes, the wire 50, contact 26, armature 23 and ground wire 27. Thus, the horn 11 is intermittently energized at a relatively rapid rate while relay 15 is energized.

It will be noted that when the relay 15 becomes energized, the heater winding 44 of the timed switch device 43 becomes energized by a circuit comprising the wire 17 (connected to the ungrounded battery terminal) the heater winding 44, the wire 21, the armature 22, the contact 25, the wire 38, the arm 41, the contact 42 and the ground wire 27. After a predetermined time period, for example, a period of the order of thirty seconds, the arm 41 flexes away from the contact 42 and interrupts the holding circuit of the relay 15, allowing the relay to become deenergized. If the electrodes 35 and 36 continue to be bridged by the mercury 39 after arm 41 cools sufficiently to re-engage the contact 42, the relay 15 will again become energized and will re-establish its holding circuit, above described, to repeat the intermittent operation of the electric horn 11 for the timed period of closure of the switch device 43.

Similarly, when any one of the switches 60 is closed, for example, by the unauthorized opening of a vehicle door, the relay 15 becomes energized by a circuit comprising wire 17 (connected to the ungrounded battery terminal), wire 16, the winding of the relay 15, the wire 21, armature 22, contact 24, wire 40, the closed switch 60 and the grounded wire 61. This energizes the relay 15 and establishes its holding circuit comprising armature 22, contact 25, arm 41, contact 42 and ground wire 27, as above described. The horn 11 becomes energized intermittently by the closure of the contact elements 23 and 26, as above described, and intermittent energization of the horn 11 continues for the time period during which the bimetal arm 41 continues to engage the contact 42. At the end of this time, the holding circuit for the relay 15 is interrupted, as above described, but the relay will become reenergized if a door switch 60 is closed at the end of the time required for cooling of the arm 41 sufficiently to reengage contact 42.

The resistors 19 and 48 will have values in accordance with the particular voltage of the vehicle system with which the apparatus is employed. Thus, if the vehicle has a six volt system, the resistors 19 and 48 will have relatively low values, whereas higher values of these resistors will be required if the apparatus is employed with a vehicle having a twelve volt electrical system.

It will be noted that the tilt-responsive switch device 28 and the door switches 60 are merely examples of various types of condition-responsive switches which may be employed for detection of an alarm condition in connection with the associated vehicle. For example, heat-responsive switch devices may be employed so as to provide an audible alarm in case of fire, namely, to energize the sound-emitting device 11 when the temperature in the vehicle adjacent the condition-responsive switch device rises above a predetermined limiting value.

What is claimed is:

1. In a motor vehicle, a normally open tilt-responsive mercury switch, means pivotally mounting said switch on a portion of the vehicle, an upwardly directed adjusting screw threadedly engaged through said portion and underlying said switch to adjust the normal position of the switch, spring means biasing the mercury switch against the top end of said adjusting screw, said switch being adapted to close responsive to tilting or oscillation of the vehicle, an electrically operated sound-emitting device mounted on the vehicle, a source of current, a relay including a pair of normally closed contacts, means including said normally closed contacts to connect said relay to said source responsive to closure of said switch and including a timing switch having an operating winding connected in parallel with the relay and having a first pair of contacts connected in circuit with the relay, said contacts opening after a predetermined time period of energization of the relay, a normally open second pair of contacts operated by said relay, and means connecting said sound-emitting device to said source through said second pair of contacts.

2. In a motor vehicle, a normally open mercury switch, means pivotally mounting said switch on a portion of the vehicle, an upwardly directed adjusting screw threadedlly engaged through said portion and underlying said switch to adjust the normal position of the switch, spring means biasing the mercury switch against the top end of said adjusting screw, said switch being adapted to close responsive to tilting of the vehicle, an electrically operated sound-emitting device mounted on the vehicle, a source of current, a relay having a pair of normally closed contacts, an energizing circuit including said normally closed contacts, a timing switch and said condition-responsive switch means connecting said relay to said source of current, a first pair of normally open contacts on said relay, a blinker switch, means connecting said sound-emitting device to said source through said first pair of normally open contacts and said blinker switch, a second pair of normally open contacts on said relay, a heater winding in said timing switch opening the timing switch after a predetermined period of energization thereof, a holding circuit connecting said relay to said source through said second pair of normally open contacts and said timing switch, and means connecting said heater winding in parallel with said relay, whereby to deenergize the relay and to deenergize said sound-emitting device after said predetermined period, subsequent to energization of the relay 3. In a motor vehicle, an adjustable tilt-responsive mercury switch, means pivotally mounting said switch on a portion of the vehicle, an upwardly directed adjusting screw threadedly engaged through said portion and underlying said switch to adjust the normal position of the switch, spring means biasing the mercury switch against the top end of said adjusting screw, said switch being adapted to close responsive to a predetermined degree of tilting or oscillation of the vehicle, an electrically operated sound-emitting device mounted on the vehicle, a source of current, a relay having a pair of normally closed contacts, an energizing circuit including said normally closed contacts, a timing switch and said tilt-responsive switch connecting said relay to said source of current, a first pair of normally open contacts on said relay, a blinker switch, means connecting said sound-emitting device to said source through said first pair of contacts and said blinker switch, a second pair of normally open contacts on said relay, a heater winding in said timing switch opening the timing switch after a predetermined period of energization thereof, a holding circuit connecting said relay to said source through said second pair of normally open contacts and said timing switch, and means connecting said heater winding in parallel with said relay, whereby to deenergize the relay and to deenergize said sound-emitting device after said predetermined period, subsequent to energization of the relay.

References Cited in the file of this patent

UNITED STATES PATENTS

| | | |
|---|---|---|
| 2,618,712 | Moledzky | Nov. 18, 1952 |
| 2,924,817 | Dawkins et al. | Feb. 9, 1960 |

FOREIGN PATENTS

| | | |
|---|---|---|
| 301,613 | Switzerland | Nov. 16, 1954 |